(12) United States Patent
Chao et al.

(10) Patent No.: US 11,782,839 B2
(45) Date of Patent: Oct. 10, 2023

(54) FEATURE MAP CACHING METHOD OF CONVOLUTIONAL NEURAL NETWORK AND SYSTEM THEREOF

(71) Applicant: NEUCHIPS CORPORATION, Hsinchu (TW)

(72) Inventors: Ping Chao, Taipei (TW); Chao-Yang Kao, Hsinchu (TW); Youn-Long Lin, Hsinchu (TW)

(73) Assignee: NEUCHIPS CORPORATION, Hsinchu (TW)

( * ) Notice: Subject to any disclaimer, the term of this patent is extended or adjusted under 35 U.S.C. 154(b) by 1050 days.

(21) Appl. No.: 16/543,645

(22) Filed: Aug. 19, 2019

(65) Prior Publication Data
US 2020/0065250 A1 Feb. 27, 2020

Related U.S. Application Data

(60) Provisional application No. 62/720,335, filed on Aug. 21, 2018.

(51) Int. Cl.
| | |
|---|---|
| *G06F 5/06* | (2006.01) |
| *G06N 3/04* | (2023.01) |
| *G06F 12/0871* | (2016.01) |
| *G06F 12/0893* | (2016.01) |
| *G06N 3/063* | (2023.01) |

(52) U.S. Cl.
CPC ............ *G06F 12/0871* (2013.01); *G06F 5/06* (2013.01); *G06F 12/0893* (2013.01); *G06N 3/04* (2013.01); *G06N 3/063* (2013.01)

(58) Field of Classification Search
CPC ............ G06N 3/04; G06N 3/063; G06N 3/08; G06N 3/06; G06F 5/06; G06F 12/0871; G06F 12/0893
See application file for complete search history.

(56) References Cited

U.S. PATENT DOCUMENTS

2018/0253635 A1* 9/2018 Park .......................... G06N 3/02
2018/0341495 A1* 11/2018 Culurciello .............. G06N 3/04

* cited by examiner

*Primary Examiner* — Kamran Afshar
*Assistant Examiner* — Brian J Hales
(74) *Attorney, Agent, or Firm* — CKC & Partners Co., LLC

(57) ABSTRACT

A feature map caching method of a convolutional neural network includes a connection analyzing step and a plurality of layer operation steps. The connection analyzing step is for analyzing a network to establish a convolutional neural network connection list. The convolutional neural network connection list includes a plurality of tensors and a plurality of layer operation coefficients. Each of the layer operation coefficients includes a step index, at least one input operand label and an output operand label. The step index as a processing order for the layer operation step. At least one of the layer operation steps is for flushing at least one of the tensors in a cache according to a distance between the at least one of the layer operation steps and a future layer operation step of the layer operation steps. The distance is calculated according to the convolutional neural network connection list.

16 Claims, 5 Drawing Sheets s100 connection analyzing step — s110 layer operation steps — s120

FEATURE MAP CACHING METHOD OF CONVOLUTIONAL NEURAL NETWORK AND SYSTEM THEREOF

RELATED APPLICATIONS

This application claims priority to U.S. Provisional Application Ser. No. 62/720,335, filed Aug. 21, 2018, which is herein incorporated by reference.

BACKGROUND

Technical Field

The present disclosure relates to a feature map caching method of convolutional neural network and system thereof. More particularly, the present disclosure relates to feature map caching method of convolutional neural network and system thereof which according to a convolutional neural network connection list.

Description of Related Art

Because a first in first out (FIFO) flushing algorithm and a last recently used (LRU) flushing algorithm may flush a tensor in a cache which will be used in the future, and stored the tensor into a DRAM. Therefore, DRAM access times are increased and cause the DRAM bandwidth power consumption of the system to be increased.

Hence, how to optimize the DRAM access times to reduce the DRAM bandwidth power consumption is the most important issue.

SUMMARY

According to one aspect of the present disclosure, a feature map caching method of a convolutional neural network includes a connection analyzing step and a plurality of layer operation steps. The connection analyzing step is for analyzing a network to establish a convolutional neural network connection list. The convolutional neural network connection list includes a plurality of tensors and a plurality of layer operation coefficients. Each of the tensors includes a plurality of feature maps. Each of the layer operation coefficients includes a step index, at least one input operand label and an output operand label. The step index is a processing order for the layer operation step. The input operand label is for selecting a part of the tensors, and the output operand label is for assigning one of the tensors. At least one of the layer operation steps is for flushing at least one of the tensors in a cache according to a distance between the at least one of the layer operation steps and a future layer operation step of the layer operation steps with the at least one input operand label that matches the at least one of the tensors, and the at least one layer operation steps is for performing a convolutional operation step according to the layer operation coefficients. The distance is calculated according to the convolutional neural network connection list.

According to another aspect of the present disclosure, a system of the feature map caching method of the convolutional neural network includes a lookup controller, a Central Processing Unit (CPU), the cache and a Dynamic Random Access Memory (DRAM). The lookup controller is for performing the connection analyzing step so as to establish the convolutional neural network connection list. The Central Processing Unit is for performing the layer operation steps. The cache is electronically connected to the Central Processing Unit and performing the layer operation steps. The Dynamic Random Access Memory is electronically connected to the cache and performing a Dynamic Random Access Memory write-back step.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

Figure 1:
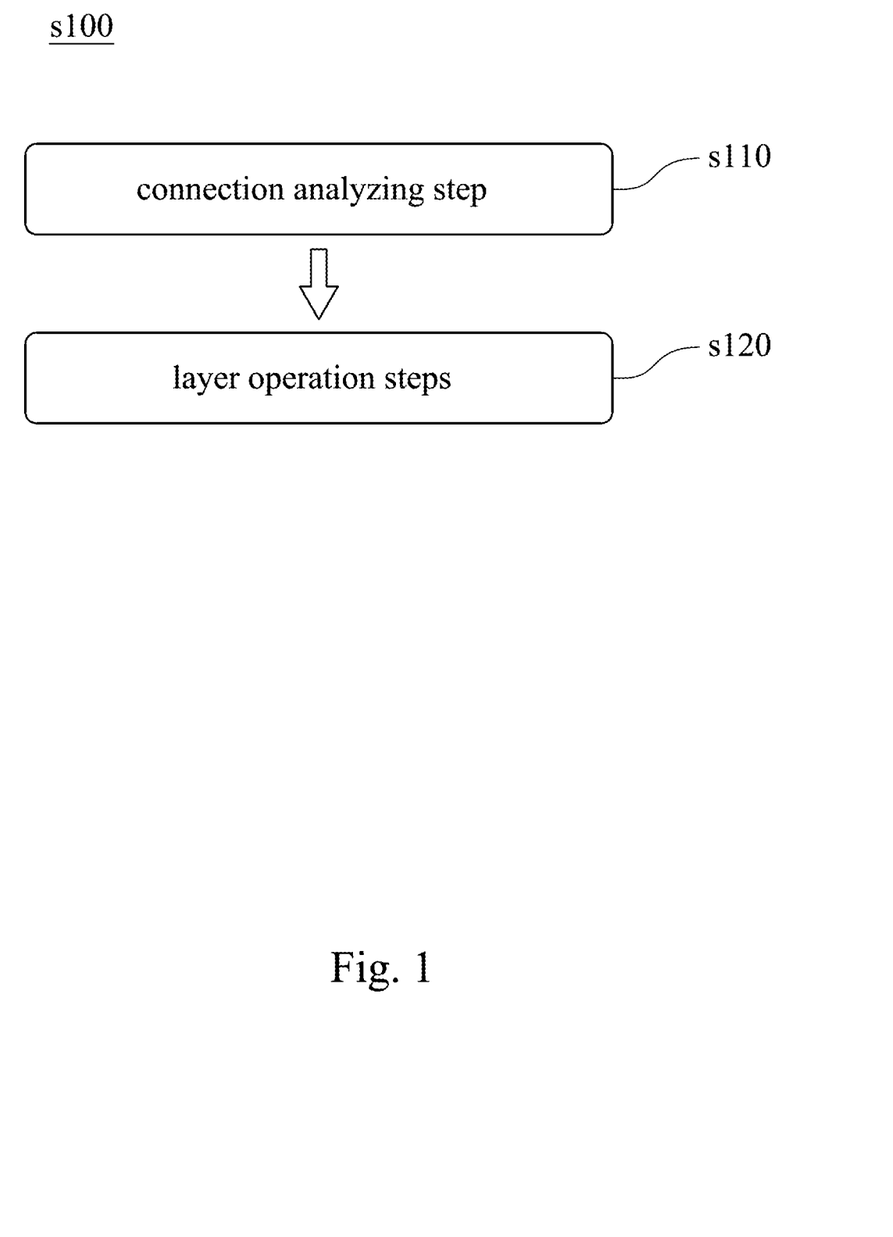
FIG. 1 shows a flow chart of a feature map caching method of a convolutional neural network according to one embodiment of the present disclosure.
Figure 2:
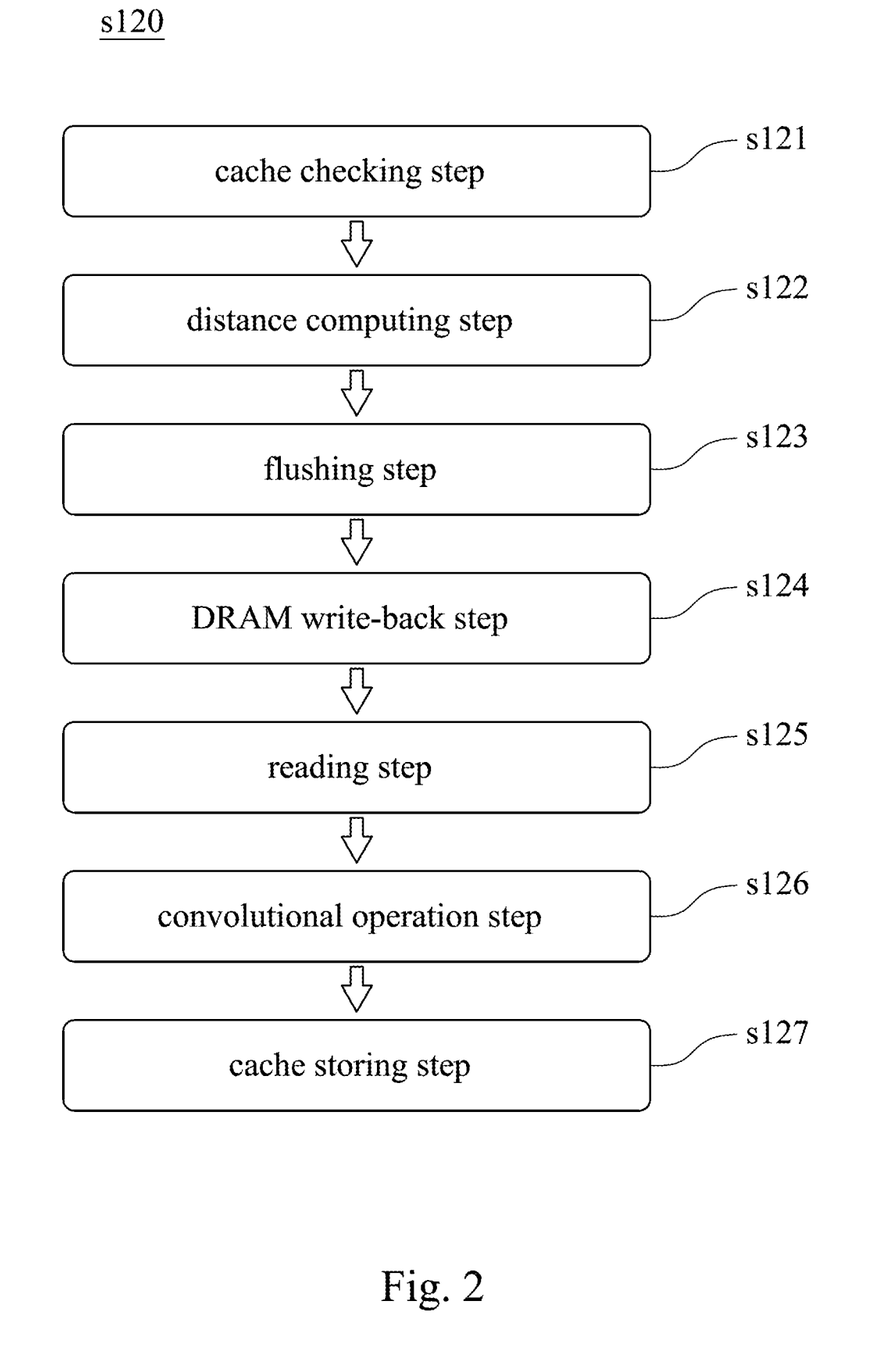
FIG. 2 shows a flow chart of one of the layer operation steps of FIG. 1.
Figure 3:
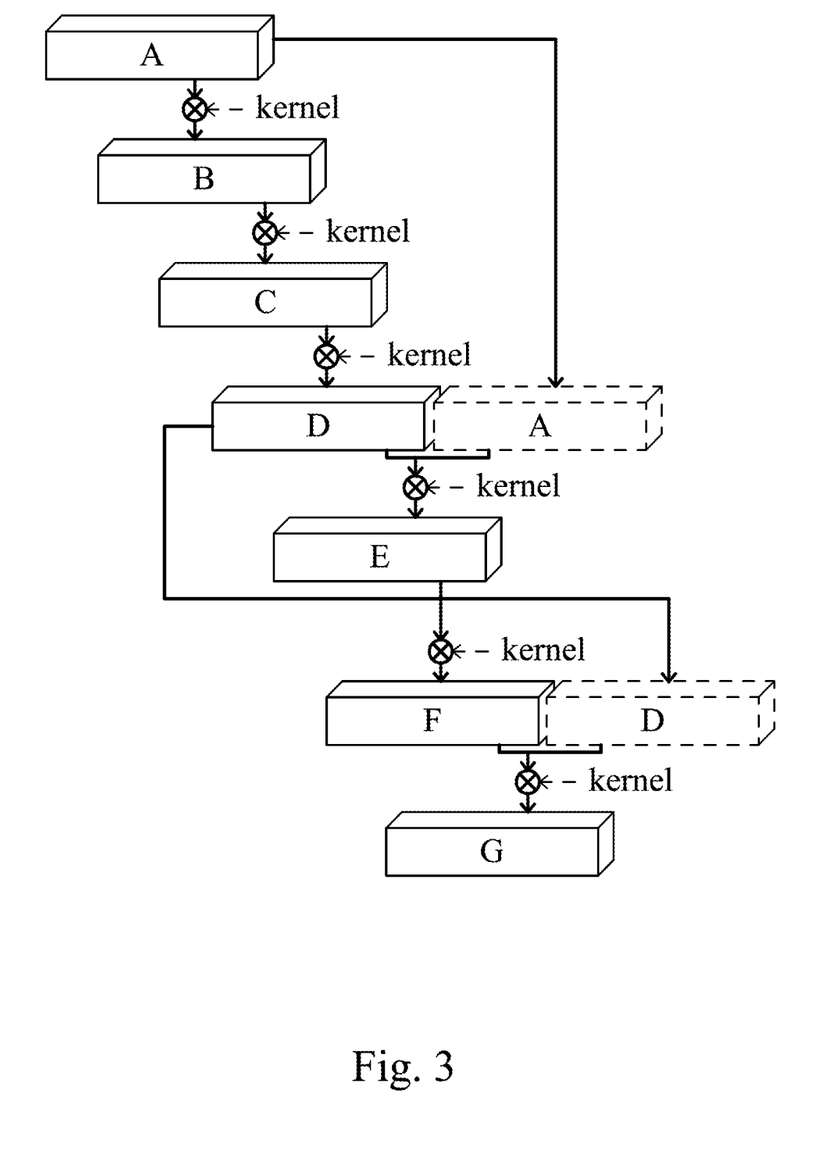
FIG. 3 shows a schematic diagram of one example of the feature map caching method of the convolutional neural network of FIG. 1.

FIG. 1 shows a flow chart of a feature map caching method s100 of a convolutional neural network according to one embodiment of the present disclosure. FIG. 2 shows a flow chart of one of the layer operation steps s120 of FIG. 1. FIG. 3 shows a schematic diagram of one example of the feature map caching method s100 of the convolutional neural network of FIG. 1. In FIG. 1, FIG. 2 and FIG. 3, the feature map caching method s100 of the convolutional neural network includes a connection analyzing step s110 and a plurality of layer operation steps s120.

In detail, the connection analyzing step s110 is for analyzing a network to establish a convolutional neural network connection list. The convolutional neural network connection list includes a plurality of tensors and a plurality of layer operation coefficients. Each of the tensors includes a plurality of feature maps, and a number of the feature maps are a channel number of the tensor. Each of the layer operation coefficients includes a step index, an operation type and at least one input operand label and an output operand label. The step index is a processing order for a layer operation step. The operation type indicating a layer operation of the layer operation step is a convolution, an activation, or a batch normalization. The at least one input operand label is for selecting a part of the tensors as the input, and the output operand label is for assigning one of the tensors as the output. At least one of the layer operation steps s120 is for flushing at least one of the tensors in a cache 430 (shown in FIG. 5) according to a distance between the at least one of the layer operation steps s120 and a future layer operation step of the layer operation steps s120 with the at least one input operand label that matches the at least one of the tensors, and a part of the layer operation steps s120 is for performing a convolutional operation step s126 according to the layer operation coefficients. The distance is calculated according to the convolutional neural network connection list. Table 1 lists a convolutional neural network connection list and a conventional cache operation script. Table 2 lists a convolutional neural network connection list and a cache operation script of the feature map caching method s100 of the convolutional neural network corresponding to the FIG. 3. In Table 1 and Table 2, a number of DRAM access times of the conventional method is nine, and a number of DRAM access times of the feature map caching method s100 of the convolutional neural network is one. Therefore, the feature map caching method s100 of the convolutional neural network can optimize the DRAM access times so as to reduce the DRAM bandwidth power consumption because the DRAM access times will consume most of the DRAM bandwidth power consumption in the system.

of the tensors storing in the cache 430 is depended on the capacity of the cache 430 and the number of the feature maps.

Please refer to FIG. 2, FIG. 3 and Table 2. Each of the layer operation steps s120 includes a cache checking step s121. The cache checking step s121 is for checking the tensors in the cache 430 and a number of the tensors in the cache 430. In Table 2, a content of each of the layer operation steps s120 is denoted that the tensors storing in the cache 430 after performing each of the layer operation steps s120. A performing result of the cache checking step s121 of the layer operation step 1 represents no tensor storing in the cache 430. A performing result of the cache checking step s121 of the layer operation step 2 is two tensors storing in the cache 430 and respective to the tensor A and the tensor B. In other words, the performing result of the cache checking step s121 of the layer operation step 2 can correspond to the content of the cache operation script of the layer operation step 1 in Table 2 because the layer operation steps

TABLE 1

| | convolutional neural network connection list | | Conventional cache operation script | | | |
|---|---|---|---|---|---|---|
| layer operation steps | input operand label | output operand label | Content | Flush | Read | Write |
| layer operation step 1 | A | B | A, B | — | A | — |
| layer operation step 2 | B | C | A, B, C | — | — | — |
| layer operation step 3 | C | D | B, C, D | A | — | A |
| layer operation step 4 | D, A | E | D, A, E | B, C | A | B, C |
| layer operation step 5 | E | F | A, E, F | D | — | D |
| layer operation step 6 | F, D | G | F, B, G | A, E | D | A, E |
| DRAM access times | — | — | — | — | 3 | 6 |

TABLE 2

| | convolutional neural network connection list | | cache operation script | | | |
|---|---|---|---|---|---|---|
| layer operation steps | input operand label | output operand label | Content | Flush | Read | Write |
| layer operation step 1 | A | B | A, B | — | A | — |
| layer operation step 2 | B | C | A, B, C | — | — | — |
| layer operation step 3 | C | D | A, C, D | B | — | — |
| layer operation step 4 | D, A | E | A, D, E | C | — | — |
| layer operation step 5 | E | F | D, E, F | A | — | — |
| layer operation step 6 | F, D | G | D, F, G | E | — | — |
| DRAM access times | — | — | — | — | 1 | 0 |

The at least one of the layer operation steps s120 flushes at least one of the tensors in the cache 430 according to the distance. The at least one of the tensors which needs to be flushed has a largest distance corresponding to each of the tensors in the cache 430. Therefore, the DRAM access times can be optimized so as to reduce the DRAM bandwidth power consumption.

The connection analyzing step s110 of the feature map caching method s100 of the convolutional neural network analyzes the network so as to establish the convolutional neural network connection list of Table 2. In order to describe clearly, in Table 2, the capacity of the cache 430 can store three tensors. However, in real application, a number s120 performs the cache checking step s121 of the layer operation step 2 after performing the layer operation step 1. Hence, the performing result of the cache checking step s121 of the layer operation step 3 is corresponded to the content of the cache operation script of the layer operation step 2 in Table 2, and the number of the tensors in the cache 430 is three. A performing result of the cache checking step s121 of each of a layer operation step 4 to a layer operation step 6 is same as above, and will not be described again herein.

Each of the layer operation steps s120 further includes a distance computing step s122. The distance computing step s122 is for calculating the distance corresponding to each of the tensors in the cache 430 according to the convolutional neural network connection list and the cache operation script. The distance corresponding to each of the tensors in the cache 430 is corresponded by formula (1).

$$dist_t^{(i)} = \begin{cases} N, & \text{if all the } j \text{ with } i < j \leq N \text{ such that } t \notin Tin_j \\ \min_{i < j \leq N, t \in Tin_j} (j - i), & \text{otherwise} \end{cases} \quad (1)$$

wherein i is a step index of a layer operation step i and i is from 1 to N, j is a step index of a layer operation step j, N is a number of the layer operation steps, and t is one of the tensors in the cache, and $Tin_j$ is a set of the at least one input operand label of the layer operation step j. When layer operation step j does not exist in the convolutional neural network connection list, $dis_t^{(i)}$=N. Therefore, the distance computing step s122 of each of the layer operation steps s120 via the formula (1) to compute each of the distance corresponding to each of the tensors in the cache 430 so as to perform the flushing step s123 of each of the layer operation steps s120.

Please refer to FIG. 3 and Table 2, the number of the layer operation steps s120 is six, and it denotes N=6. In the layer operation step 1, the step index of the layer operation step 1 is 1. The distance computing step s122 of the layer operation step 1 is not performed because there is no tensor in the cache 430. In the layer operation step 3, the step index of the layer operation step 3 is 3. The distance computing step s122 of the layer operation step 3 calculates the distance corresponding to each of the tensor A, the tensor B and the tensor C because of the performing result of the cache checking step s121 of the layer operation step 3. In detail, the distance corresponding to each of the tensor A, the tensor B and the tensor C is calculated according to the convolutional neural network connection list of Table 2. In other words, according to the formula (1), the distance corresponding to the tensor A, the tensor B and the tensor C are the difference between the step index of the layer operation step 3 and the step index of the future layer operation step of the tensor A, the tensor B and the tensor C respectively. Therefore, in the layer operation step 3, the step index corresponding to each of the tensor A, the tensor B and the tensor C is the step index of the layer operation step 3, it denotes i=3. Further, according to the convolutional neural network connection list of Table 2, the tensor A is an input operand label of the layer operation step 4, and it denotes the future layer operation step of the tensor A is the layer operation step 4 and j corresponding to the tensor A is four. The tensor C is an input operand label of the layer operation step 3, and it denotes the future layer operation step of the tensor C is the layer operation step 3 and j corresponding to the tensor C is three. Therefore, when t is tensor A, $dist_A^{(3)}$=1. when t is tensor C, $dist_C^{(3)}$=0. The tensor B is not one of the input operand label of the layer operation step 3 to the layer operation step 6, it denotes j corresponding to the tensor B does not exist in the convolutional neural network connection list of Table 2, and $dist_B^{(3)}$=N. The distance computing step s122 of the layer operation step 4 to layer operation step 6 is same as above, and will not be described again herein.

Each of the layer operation steps s120 further includes a flushing step s123. The flushing step s123 is for flushing the at least one of the tensors in the cache 430 according to the distance corresponding to each of the tensors in the cache 430 and the convolutional neural network connection list. A distance corresponding to each of the at least one of the tensors in the cache 430 is greater than or equal to a distance corresponding to each of the tensors which is not flushed in the cache 430. Therefore, the flushing step s123 flushes the at least one of the tensors in the cache 430 so as to avoid a capacity of the cache 430 exceeds after performing each of the layer operation step s120 according to the convolutional neural network connection list. Please refer to Table 2, the layer operation step 1 and the layer operation step 2 do not perform the flushing step s123 because the capacity of the cache 430 is not exceeded after performing the layer operation step 1 and the layer operation step 2. In the cache checking step s121 of the layer operation step 3, there are the tensor A, the tensor B and the tensor C in the cache 430. In layer operation step 3, if the flushing step s123 is not performed, the capacity of the cache 430 will be exceeded after performing the layer operation step 3 because the capacity of the cache 430 is three tensors. The flushing step s123 of layer operation step 3 flushes at least one of the tensors in the cache so as to avoid the capacity of the cache 430 exceed. According to the preforming result of the distance computing step s122 of the layer operation step 3, the distances corresponding to the tensor A, the tensor B and the tensor C are $dist_A^{(3)}$=1, $dist_B^{(3)}$=N=6 and $dist_C^{(3)}$=0 respectively. Therefore, the tensor B is flushed in the flushing step s123 of the layer operation step 3 because the distance corresponding to the tensor B is greater than each of the distance corresponding to the tensor A and the tensor C. The flushing step s123 of each of the layer operation step 4 to layer operation step 6 is same as above, and will not be described again herein. Further, when a part of the distance corresponding to each of the at least one of the tensors which needs to be flushed in the cache 430 is equal to another part of the distance corresponding to each of the tensors which is not flushed in the cache 430, the at least one of the tensors which needs to be flushed in the cache 430 is selected by a first in first out (FIFO) flushing method.

Each of the layer operation steps s120 further includes a Dynamic Random Access Memory (DRAM) write-back step s124. The DRAM write-back step s124 is for determining whether the at least one of the tensors in the cache 430 needs to be written back to a Dynamic Random Access Memory (DRAM) 440 (shown in FIG. 5) according to the convolutional neural network connection list. When the distance corresponding to each of the at least one of the tensors which needs to be flushed in the cache 430 is less than N, the at least one of the tensors which needs to be flushed from the cache 430 is written into the DRAM 440. When the distance corresponding to each of the at least one of the tensors which needs to be flushed from the cache 430 is equal to N, the at least one of the tensors which needs to be flushed from the cache 430 is flushed without being written into the DRAM 440. Therefore, the feature map caching method s100 of the convolutional neural network can optimize the DRAM access times so as to reduce the DRAM bandwidth power consumption.

Each of the layer operation steps s120 further includes a reading step s125. The reading step s125 is for reading at least another one of the tensors from the DRAM 440 and storing into the cache 430 according to the convolutional neural network connection list. Please refer to FIG. 3 and Table 2, the tensor A is the input operand label of the layer operation step 1. However, the performing result of the cache checking step s121 of the layer operation step 1, the tensor A is not stored in the cache 430. The tensor A is stored in the DRAM 440. Therefore, the reading step s125 of the layer operation step 1 read the tensor A from the DRAM 440 and stores into the cache 430 so as to perform the convolutional operation step s126 of the layer operation step 1 because the tensor A is the input operand label of the convolutional operation step s126 of the layer operation step 1.

Each of the layer operation coefficients further includes a kernel. The kernel and the at least one input operand label are configured to perform the convolutional operation. The convolutional operation step s126 is for calculating the output operand label by the convolutional operation with the at least one input operand label and the kernel. When a number of the input operand label is plural, the input operand labels concatenate to each other along a channel dimension, and then the convolutional operation is performed. Please refer to FIG. 3 and Table 2, the convolutional operation step s126 of layer operation step 1, the tensor B is calculated by the convolutional operation with the tensor A and the kernel of the layer operation step 1. In the layer operation step 4, a number of the at least one input operand label of the convolutional operation step s126 is two. The convolutional operation step s126 of layer operation step 4 concatenates the tensor A and the tensor D to each other along the channel dimension and then performs the convolutional operation with the kernel of the layer operation step 4 so as to calculate the tensor E. The convolutional operation step s126 of the layer operation step 2, the layer operation step 3, the layer operation step 5 and the layer operation step 6 are same as above, and will not be described again herein.

Each of the layer operation steps s120 further includes a cache storing step s127. The cache storing step s127 is for storing the output operand label into the cache 430. Please refer to FIG. 3 and Table 2, the cache storing step s127 of the layer operation step 1 stores the tensor B into the cache 430. Therefore, the content of the cache 430 of the layer operation step 1 is the tensor A and the tensor B. The cache storing step s127 of the layer operation step 2 to the layer operation step 6 are same as above, and will not be described again herein.

As given above, the feature map caching method s100 of the convolutional neural network via the connection analyzing step s110 and the layer operation steps s120 so as to optimize the DRAM access times and reduce the DRAM bandwidth power consumption.

Figure 4:
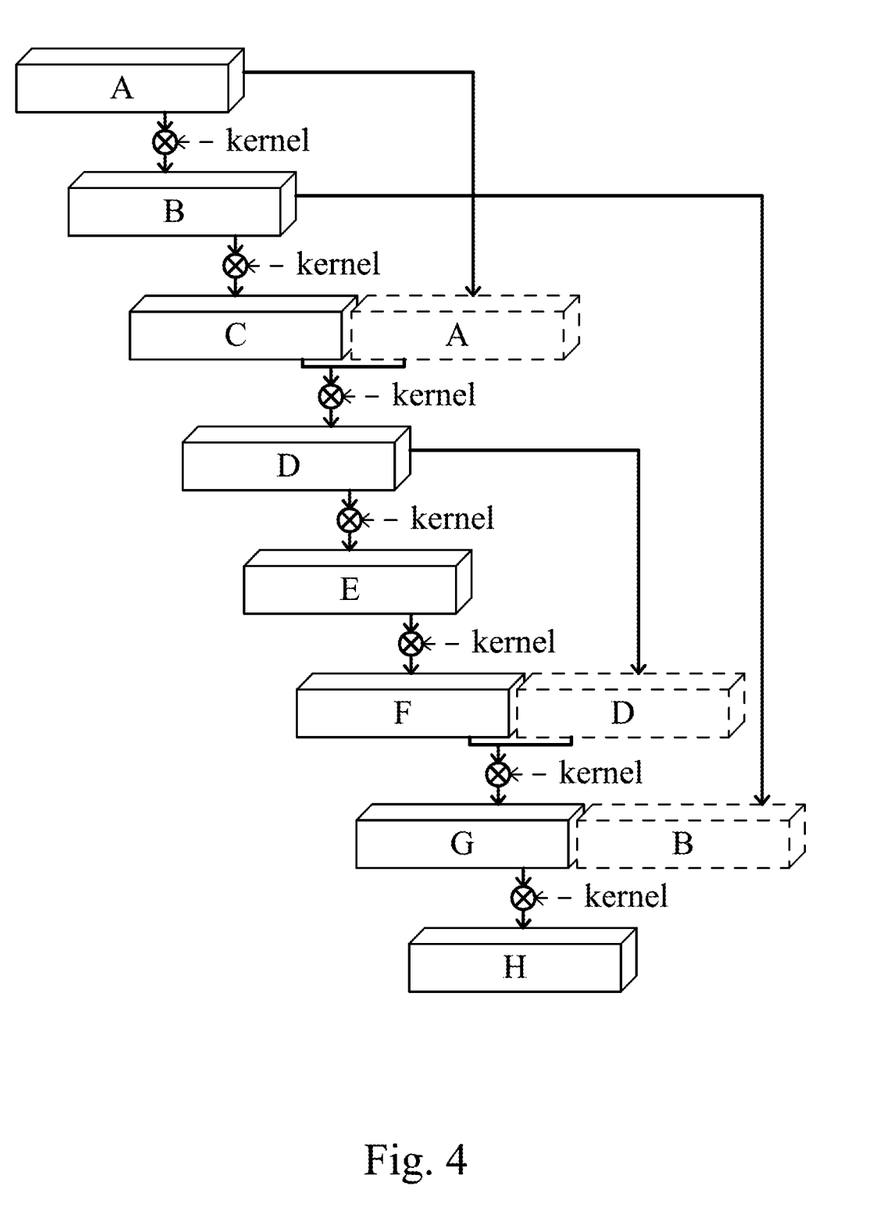
FIG. 4 shows a schematic diagram of another example of the feature map caching method of the convolutional neural network of FIG. 1.

Please refer to FIG. 1, FIG. 2, FIG. 4 and Table 3, FIG. 4 shows a schematic diagram of another example of the feature map caching method s100 of the convolutional neural network of FIG. 1. Table 3 lists a convolutional neural network connection list and a cache operation script of FIG. 4. The connection analyzing step s110 of the feature map caching method s100 of the convolutional neural network analyzes the network so as to establish the convolutional neural network connection list of Table 3. The number of the layer operation steps s120 is seven, it denotes N=7. Further, the capacity of the cache 430 is three tensors. However, the capacity of the cache 430 can be any positive integer, and the present disclosure is not limited thereto.

TABLE 3 convolutional neural network connection list

| layer operation steps | input operand label | output operand label | cache operation script | | | |
|---|---|---|---|---|---|---|
| | | | Content | Flush | Read | Write |
| layer operation step 1 | A | B | A, B | — | A | — |
| layer operation step 2 | B | C | A, B, C | — | — | — |
| layer operation step 3 | A, C | D | A, C, D | B | — | B |
| layer operation step 4 | D | E | C, D, E | A | — | — |
| layer operation step 5 | E | F | D, E, F | C | — | — |
| layer operation step 6 | F, D | G | D, F, G | E | — | — |
| layer operation step 7 | G, B | H | B, G, H | D, F | B | — |

In the layer operation step 1, the performing result of the cache checking step s121 represents none tensor stored in the cache 430. Therefore, the layer operation step 1 do not perform the distance computing step s122, the flushing step s123 and the DRAM write-back step s124 because there represents none tensor in the cache 430. The reading step s125 of the layer operation step 1 read the tensor A from the DRAM 440 and stores into the cache 430 so as to perform the convolutional operation step s126 of the layer operation step 1. The convolutional operation step s126 of the layer operation step 1 calculates the tensor B by the convolution operation with the tensor A and the kernel of the layer operation step 1. The cache storing step s127 of the layer operation step 1 stores the tensor B into the cache 430. Hence, the content of the layer operation step 1 is two tensors in the cache 430 and respective to the tensor A and the tensor B. After performing the cache storing step s127 of the layer operation step 1, the feature map caching method s100 of the convolutional neural network starts to perform the layer operation step 2.

In the layer operation step 2, the step index of the layer operation step 2 is 2. The performing result of the cache checking step s121 represents two tensors storing in the cache 430 and respective to the tensor A and the tensor B. According to the formula (1), the distance corresponding to the tensor A and the tensor B are the difference between the step index of the layer operation step 2 and the step index of the future layer operation step of the tensor A and the tensor B respectively. In the layer operation step 2, i corresponding to each of the tensor A and the tensor B is the step index of the layer operation step 2, it denotes i=2. According to the convolutional neural network connection list of Table 3, the tensor A is the input operand label of the layer operation step 3, it denotes the future layer operation step of the tensor A is the layer operation step 3, and j corresponding to the tensor A is three. The tensor B is the input operand label of the layer operation step 2, it denotes the future layer operation step of the tensor B is the layer operation step 2, and j corresponding to the tensor B is two. Therefore, when t is the tensor A, $dist_A^{(2)}=1$. When t is (2) the tensor B, $dist_B^{(2)}=0$. The flushing step s123 of the layer operation step 2 is not performed because the capacity of the cache 430 does not exceed after performing the layer operation step 2 according to the convolutional neural network connection list. The DRAM write-back step s124 of the layer operation step 2 is not performed because the flushing step s123 without flushes any tensor from the cache 430. The reading step s125 of the layer operation step 2 is not performed because the input operand label of the convolution operation step s126 is the tensor B, and the tensor B is stored in the cache 430 already. The convolutional operation step s126 of the layer operation step 2 calculates the tensor C by the convolution operation with the tensor B and the kernel of the layer operation step 2. The cache storing step s127 of the layer operation step 2 stores the tensor C into the cache 430. Hence, the content of the layer operation step 2 is three tensors in the cache 430 and respective to the tensor A, the tensor B and the tensor C. After performing the cache storing step s127 of the layer operation step 2, the feature map caching method s100 of the convolutional neural network starts to perform the layer operation step 3.

In the layer operation step 3, the step index of the layer operation step 3 is 3. The performing result of the cache checking step s121 represents three tensors stored in the cache 430 and respective to the tensor A, the tensor B and the tensor C. In the distance computing step s122 of the layer operation step 3, the distances corresponding to the tensor A, the tensor B and the tensor C are the difference between the step index of the layer operation step 3 and the step index of the future layer operation step of the tensor A, the tensor B and the tensor C respectively. In the layer operation step 3, i corresponding to each of the tensor A, the tensor B and the tensor C is the step index of the layer operation step 3, it denotes i=3. According to the convolutional neural network connection list and the cache operation script of Table 3, the tensor A and the tensor C are the input operand labels of the layer operation step 3, it denotes j corresponding to each of the tensor A and the tensor C is three respectively. The tensor B is the input operand label of the layer operation step 7, it denotes j corresponding to the tensor B is seven. Therefore, when t is the tensor A, $dist_A^{(3)}=0$. When t is the tensor B, $dist_B^{(3)}=4$. When t is the tensor C, $dis_A^{(3)}=0$. The tensor B is the tensor which needs to be flushed in the cache 430, because of the largest distance. Therefore, the flushing step s123 flushes the tensor B so as to avoid the cache 430 exceeds after performing the layer operation step 3. However, the distance corresponding to the tensor B is less than N, the tensor B is written into the DRAM 440 at the DRAM write-back step s124. The reading step s125 is not performed because the input operand label of the convolution operation step s126 is stored in the cache 430 already. The number of the input operand label is 2, and the input operand labels are the tensor A and the tensor C respectively. The convolutional operation step s126 of the layer operation step 3 concatenates the tensor A and the tensor C to each other along the channel dimension and then performs the convolutional operation with the kernel of the layer operation step 3 so as to calculate the tensor D. The cache storing step s127 stores the tensor D into the cache 430. Hence, the content of the layer operation step 3 is three tensors in the cache 430 and respective to the tensor A, the tensor C and the tensor D. After performing the layer operation step 3, the feature map caching method s100 of the convolutional neural network starts to perform the layer operation step 4.

In the layer operation step 4, the step index of the layer operation step 4 is 4. The performing result of the cache checking step s121 represents three tensors stored in the cache 430 and respective to the tensor A, the tensor C and the tensor D. In the distance computing step s122, the distance corresponding to the tensor A, the tensor C and the tensor D are the difference between the step index of the layer operation step 4 and the and the step index of the future layer operation step of the tensor A, the tensor C and the tensor D respectively. In the layer operation step 4, i corresponding to each of the tensor A, the tensor C and the tensor D are the step index of the layer operation step 4, it denotes i=4. According to the convolutional neural network connection list and the cache operation script of Table 3, the tensor D is the input operand label of the layer operation step 4, it denotes j corresponding to the tensor D is four. The tensor A and the tensor C do not the input operand label of the layer operation step 4 to the layer operation step 7, it denotes the distance corresponding to the tensor A and the tensor C are equal to N respectively. Therefore, when t is the tensor A, $dist_A^{(4)}=N$. When t is the tensor C, $dist_C^{(4)}=N$. When t is the tensor D, $dist_D^{(4)}=0$. Following the distance computing step s122, the distance corresponding to the tensor A and the distance corresponding to the tensor C are same, and both of them are greater than the distance corresponding to the tensor D. However, the tensor A is stored into the cache 430 earlier than the tensor C, and the flushing step s123 flushes the tensor A according to the FIFO flush method. Because the distance corresponding to the tensor A is equal to N, the tensor A is not written into the DRAM 440 at the DRAM write-back step s124. The reading step s125 is not performed because the input operand label of the convolution operation step s126 is stored in the cache 430 already. The convolutional operation step s126 calculates the tensor E by the convolution operation with the tensor D and the kernel of the layer operation step 4. The cache storing step s127 stores the tensor E into the cache 430. Hence, the content of the layer operation step 4 is three tensors in the cache 430 and respective to the tensor C, the tensor D and the tensor E. After performing the layer operation step 4, the feature map caching method s100 of the convolutional neural network starts to perform the layer operation step 5.

In the layer operation step 5, the step index of the layer operation step 5 is 5. The performing result of the cache checking step s121 represents three tensors stored in the cache 430 and respective to the tensor C, the tensor D and the tensor E. In the distance computing step s122, the distance corresponding to the tensor C, the tensor D and the tensor E are the difference between the step index of the layer operation step 5 and the and the step index of the future layer operation step of the tensor C, the tensor D and the tensor E respectively. In the layer operation step 5, i corresponding to each of the tensor C, the tensor D and the tensor E is the step index of the layer operation step 5, it denotes i=5. According to the convolutional neural network connection list and the cache operation script of Table 3, the tensor E is the input operand label of the layer operation step 5, it denotes j corresponding to the tensor E is five. The tensor D is the input operand label of the layer operation step 6, it denotes j corresponding to the tensor D is six. The tensor C do not the input operand label of the layer operation step 5 to the layer operation step 7, it denotes the distance corresponding to the tensor C is N. Therefore, when t is the tensor C, $dist_C^{(5)}=N$. When t is the tensor D, $dist_D^{(5)}=1$. When t is the tensor E, $dist_E^{(5)}=0$. Because the tensor C has the largest distance, the flushing step s123 flushes the tensor C so as to avoid the cache 430 exceed after performing the layer operation step 5. The DRAM write-back step s124 is not performed because the distance corresponding to the tensor C is equal to N. The reading step s125 is not performed because the input operand label of the convolutional operation step s126 is stored in the cache 430 already. The convolutional operation step s126 calculates the tensor F by the convolution operation with the tensor E and the kernel of the layer operation step 5. The cache storing step s127 stores the tensor F into the cache 430. Hence, the content of the layer operation step 5 are three tensors in the cache 430 and respective to the tensor D, the tensor E and the tensor F. After performing the layer operation step 5, the feature map caching method s100 of the convolutional neural network starts to perform the layer operation step 6.

In the layer operation step 6, the step index of the layer operation step 6 is 6. The performing result of the cache checking step s121 represents three tensors stored in the cache 430 and respective to the tensor D, the tensor E and the tensor F. In the distance computing step s122, the distance corresponding to the tensor D, the tensor E and the tensor F are the difference between the step index of the layer operation step 6 and the step index of the future layer operation step of the tensor D, the tensor E and the tensor F respectively. In the layer operation step 6, i corresponding to each of the tensor D, the tensor E and the tensor F is the step index of the layer operation step 6, it denotes i=6. According to the convolutional neural network connection list and the cache operation script of Table 3, the tensor D and the tensor F are the input operand labels of the layer operation step 6, it denotes j corresponding to each of the tensor D and the tensor F is six. The tensor E is not the input operand label of each of the layer operation step 6 and layer operation step 7, it denotes the distance corresponding to the tensor E is N. Therefore, when t is the tensor D, $dist_D^{(6)}=0$. When t is the tensor E, $dist_E^{(6)}=N$. When t is the tensor F, $dist_F^{(6)}=0$. The flushing step s123 of the layer operation step 6 flushes the tensor E because the distance corresponding to the tensor E is greater than each of the distances corresponding to the tensor D and the tensor F. The DRAM write-back step s124 is not performed because the distance corresponding to the tensor E is not less than N. The reading step s125 is not performed because the input operand label of the convolutional operation step s126 of the layer operation step 6 is stored in the cache 430 already. Because the number of the input operand label is two and respective to the tensor D and the tensor F, the convolutional operation step s126 of the layer operation step 6 concatenates the tensor D and the tensor F to each other along the channel dimension and then performs the convolutional operation with the kernel of the layer operation step 6 so as to calculate the tensor G. The cache storing step s127 stores the tensor G into the cache 430. Hence, the content of the layer operation step 6 is three tensors in the cache 430 and respective to the tensor D, the tensor F and the tensor G. After performing the layer operation step 6, the feature map caching method s100 of the convolutional neural network starts to perform the layer operation step 7.

In the layer operation step 7, the step index of the layer operation step 7 is 7. The performing result of the cache checking step s121 represents three tensors stored in the cache 430 and respective to the tensor D, the tensor F and the tensor G. In the distance computing step s122, the distance corresponding to the tensor D, the tensor F and the tensor G are the difference between the step index of the layer operation step 7 and the step index of the future layer operation step of the tensor D, the tensor F and the tensor G respectively. In the layer operation step 7, i corresponding to each of the tensor D, the tensor F and the tensor G is the step index of the layer operation step 7, it denotes 1=7. According to the convolutional neural network connection list and the cache operation script of Table 3, the tensor D and the tensor F do not the input operand labels of the layer operation step 7, it denotes the distance corresponding to the tensor D and the tensor F are equal to N respectively. The tensor G is one of the input operand labels of the layer operation step 7, it denotes j corresponding to the tensor D is seven. Therefore, when t is the tensor D, $dist_D^{(7)}=N$. When t is the tensor F, $dist_F^{(7)}=N$. When t is the tensor G, $dist_G^{(7)}=0$. However the input operand labels of the convolutional operation step s126 of layer operation step 7 further includes the tensor B which is not stored in the cache 430. Therefore, the flushing step s123 should flush two tensors in the cache 430 so as to store the tensor B and the output operand label of the layer operation step 7 for avoiding the cache 430 exceed after performing the layer operation step 7. The flushing step s123 flushes the tensor D and the tensor F in the cache 430 because each of the distance corresponding to the tensor D and the tensor F is greater than the distance corresponding to the tensor G. The DRAM write-back step s124 is not performed because each of the distances corresponding to the tensor D and the tensor E are equal to N. The reading step s125 read the tensor B from the DRAM 440 and stored in the cache 430. The tensor B is written into the DRAM 440 at the layer operation step 3. Because the number of the input operand label is two and respective to the tensor B and the tensor G, the convolutional operation step s126 concatenates the tensor B and the tensor G to each other along the channel dimension and then performs the convolutional operation with the kernel of the layer operation step 7 so as to calculate the tensor H. The cache storing step s127 stores the tensor H into the cache 430. Hence, the content of the layer operation step 7 is three tensors in the cache 430 and respective to the tensor B, the tensor G and the tensor H. Therefore, the feature map caching method s100 of the convolutional neural network via the connection analyzing step s110 and the layer operation steps s120 so as to optimize the DRAM access times and reduce the DRAM bandwidth power consumption.

Figure 5:
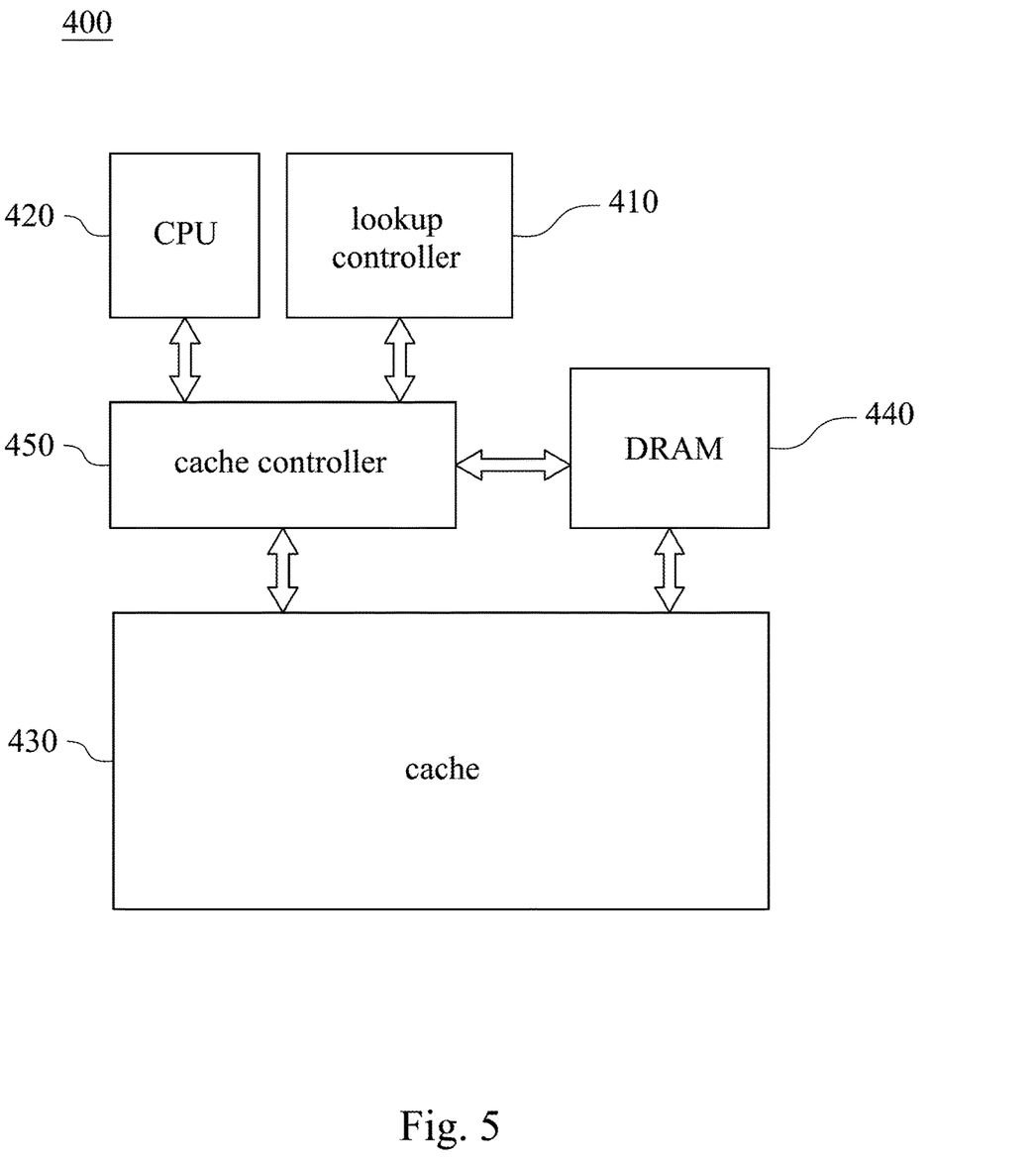
FIG. 5 shows a block diagram of a system of the feature map caching method of the convolutional neural network of FIG. 1.

FIG. 5 shows a block diagram of a system 400 of the feature map caching method s100 of convolutional neural network of FIG. 1. In FIG. 5, the system 400 of the feature map caching method s100 of the convolutional neural network includes a lookup controller 410, a Central Processing Unit (CPU) 420, the cache 430 and the Dynamic Random Access Memory (DRAM) 440.

In detail, the lookup controller 410 is for performing a connection analyzing step s110 so as to establish the convolutional neural network connection list. The Central Processing Unit (CPU) 420 is for performing the layer operation steps s120. The cache 430 is electronically connected to the CPU 420 and performing the layer operation steps s120. The DRAM 440 is electronically connected to the cache 430 and performing the DRAM write-back step s124. In other words, the system 400 via the lookup controller 410 so as to analyze the network and establishes the convolutional neural network connection list. The convolutional neural network connection list includes a plurality of tensors and a plurality of layer operation coefficients. Each of the layer operation coefficients includes the at least one input operand label and the output operand label. The input operand label is a part of the tensors, and the output operand label is one of the tensors. The CPU 420 performs the layer operation steps s120 according to the convolutional neural network connection list. In the distance computing step s122 of each of the layer operation steps s120, the CPU 420 calculates the distance corresponding to each of the tensors in the cache 430 according to the formula (1). In the flushing step s123 of each of the layer operation steps s120, the CPU 420 determines whether the cache 430 flushes the at least one tensor in the cache 430 according to the convolutional neural network connection list. When the CPU 420 determines to flush the at least one tensor in the cache 430, the CPU 420 produces a flushing command. The cache 430 flushes the at least one tensor in the cache 430 according to the flushing command. In DRAM write-back step s124, the CPU 420 determines whether the at least one of the tensors in the cache 430 needs to be written into the DRAM 440 according to the convolutional neural network connection list. When the CPU 420 determines to write the at least one of the tensors into the DRAM 440, the CPU 420 produces a DRAM storing command. The at least one of the tensors which needs to be flushed is written into the DRAM 440, according to the DRAM storing command. In reading step s125, the CPU 420 determines whether the cache 430 read and store the at least one of the tensors which is stored in the DRAM 440 according to the convolutional neural network connection list. When the CPU 420 determines to read the at least one of the tensors from the DRAM 440, the CPU 420 produces a reading command. The cache 430 read and stores the at least one of the tensors from the DRAM 440 according to the reading command. In convolutional operation step s126, the CPU 420 calculates the output operand label of each of the layer operation step s120 according to the convolutional neural network connection list. In cache storing step s127, the CPU 420 produces a cache storing command. The cache 430 stores the output operand label of each of the layer operation steps s120, according to the cache storing command.

The system 400 further includes a cache controller 450. The cache controller 450 is electronically connected to the cache 430 and the CPU 420 for configuring to send the flushing command and the cache storing command to the cache 430 so as to perform the flushing step s123 and the cache storing step s127. In detail, the cache controller 450 receives the flushing command, the DRAM storing command, the reading command and the cache storing command from the CPU 420 and transmits to the cache 430 so as to perform the layer operation steps s120.

The details of the distance computing step s122 and the flushing step s123 of each of the layer operation steps s120 are same as above, and will not be described again herein.

As given above, the system 400 via the lookup controller 410 to perform the connection analyzing step s110 so as to establish the convolutional neural network connection list. The system 400 via the CPU 420 to perform the layer operation steps s120 according to the convolutional neural network connection list so as to optimize the DRAM access times. Therefore, the DRAM bandwidth power consumption of the system 400 can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A feature map caching method of a convolutional neural network, comprising:
    analyzing a network to establish a convolutional neural network connection list, and the convolutional neural network connection list comprises:
        a plurality of tensors, wherein each of the plurality of tensors comprises a plurality of feature maps; and
        a plurality of layer operation coefficients, wherein each of the plurality of layer operation coefficients comprises:
            a step index as a processing order for a layer operation step;
            at least one input operand label for selecting a part of the plurality of tensors; and
            an output operand label for assigning one of the plurality of tensors; and
    a plurality of layer operation steps, wherein at least one of the plurality of layer operation steps is for flushing at least one of the plurality of tensors in a cache according to a distance between the at least one of the plurality of layer operation steps and a future layer operation step of the plurality of layer operation steps with the at least one input operand label that matches the at least one of the plurality of tensors, and a part of the plurality of layer operation steps is for performing a convolutional operation step according to the plurality of layer operation coefficients, and the distance is calculated according to the convolutional neural network connection list.

2. The feature map caching method of the convolutional neural network of claim 1, wherein the at least one of the plurality of tensors which needs to be flushed has a largest distance corresponding to each of the plurality of tensors in the cache.

3. The feature map caching method of the convolutional neural network of claim 1, wherein the at least one of the plurality of layer operation steps comprises:
    checking the plurality of tensors in the cache and a number of the plurality of tensors in the cache.

4. The feature map caching method of the convolutional neural network of claim 1, wherein the at least one of the plurality of layer operation steps comprises:
    a distance computing step for calculating the distance corresponding to each of the plurality of tensors in the cache according to the convolutional neural network connection list, wherein the distance corresponding to each of the plurality of tensors in the cache is corresponded by:

$$dist_t^{(i)} = \begin{cases} N, & \text{if all the } j \text{ with } i < j \leq N \text{ such that } t \notin Tin_j \\ \min_{i < j \leq N, t \in Tin_j}(j-i), & \text{otherwise} \end{cases};$$

wherein i is the step index of a layer operation step i and i is from 1 to N, j is a step index of a layer operation step j, N is a number of the plurality of layer operation steps, and t is one of the plurality of tensors in the cache, and $Tin_j$ is a set of the at least one input operand label of the layer operation step j.

5. The feature map caching method of the convolutional neural network of claim 4, wherein the at least one of the plurality of layer operation steps further comprises:
    a flushing step for flushing the at least one of the plurality of tensors in the cache according to the distance corresponding to each of the plurality of tensors in the cache and the convolutional neural network connection list, wherein a distance corresponding to each of the at least one of the plurality of tensors in the cache is greater than or equal to the distance corresponding to each of the plurality of tensors which is not flushed from the cache.

6. The feature map caching method of the convolutional neural network of claim 5, wherein when a part of the distance corresponding to each of the at least one of the plurality of tensors which needs to be flushed in the cache is equal to another part of the distance corresponding to each of the plurality of tensors which is not flushed in the cache, the at least one of the plurality of tensors which needs to be flushed in the cache is selected by a first in first out (FIFO) flushing method.

7. The feature map caching method of the convolutional neural network of claim 5, wherein the at least one of the plurality of layer operation steps further comprises:
    a Dynamic Random Access Memory (DRAM) write-back step for determining whether the at least one of the plurality of tensors in the cache needs to be written back to a Dynamic Random Access Memory (DRAM) according to the convolutional neural network connection list;
    wherein in the DRAM write-back step, when the distance corresponding to each of the at least one of the plurality of tensors which needs to be flushed from the cache is less than N, the at least one of the plurality of tensors which needs to be flushed from the cache is written into the DRAM.

8. The feature map caching method of the convolutional neural network of claim 7, wherein in the DRAM write-back step, when the distance corresponding to each of the at least one of the plurality of tensors which needs to be flushed from the cache is equal to N, the at least one of the plurality of tensors which needs to be flushed from the cache is flushed without written to the DRAM.

9. The feature map caching method of the convolutional neural network of claim 1, wherein the at least one of the plurality of layer operation steps comprises:
    a reading step for reading at least another one of the plurality of tensors from a Dynamic Random Access Memory and storing into the cache according to the convolutional neural network connection list.

10. The feature map caching method of the convolutional neural network of claim 1, wherein each of the plurality of layer operation coefficients further comprises:
    a kernel, wherein the kernel and the at least one input operand label are configured to perform a convolutional operation.

11. The feature map caching method of the convolutional neural network of claim 10, wherein the at least one of the plurality of layer operation steps comprises:
    the convolutional operation step for calculating the output operand label by the convolutional operation with the at least one input operand label and the kernel, wherein when a number of the input operand label is plural, the input operand labels concatenate to each other along a channel dimension, and then the convolutional operation is performed.

12. The feature map caching method of the convolutional neural network of claim 11, wherein the at least one of the plurality of layer operation steps further comprises:
    a cache storing step for storing the output operand label into the cache.

13. A system of the feature map caching method of the convolutional neural network of claim 1, comprising:
    a Central Processing Unit (CPU) for performing the plurality of layer operation steps;
    the cache electronically connected to the Central Processing Unit and performing the plurality of layer operation steps; and
    a Dynamic Random Access Memory (DRAM) electronically connected to the cache and performing a Dynamic Random Access Memory write-back step.

14. The system of claim 13, wherein the system of the feature map caching method of the convolutional neural network further comprises:
    a cache controller electronically connected to the cache and the Central Processing Unit for configuring to send a flushing command and a cache storing command to the cache.

15. The system of claim 13, wherein the at least one of the plurality of layer operation steps comprises:
    a distance computing step for calculating the distance corresponding to each of the plurality of tensors in the cache according to the convolutional neural network connection list, wherein the distance corresponding to each of the plurality of tensors in the cache is corresponded by:

$$dist_t^{(i)} = \begin{cases} N, & \text{if all the } j \text{ with } i < j \le N \text{ such that } t \notin Tin_j \\ \min_{i < j \le N, t \in Tin_j} (j-i), & \text{otherwise} \end{cases};$$

wherein i is a step index of a layer operation step i and i is from 1 to N, j is a step index of a layer operation step j, N is a number of the plurality of layer operation steps, and t is one of the plurality of tensors in the cache, and $Tin_j$ is a set of the at least one input operand label of the layer operation step j.

16. The system of claim 15, wherein the at least one of the plurality of layer operation steps further comprises:
    a flushing step for flushing the at least one of the plurality of tensors in the cache according to the distance corresponding to each of the plurality of tensors in the cache and the convolutional neural network connection list, wherein a distance corresponding to each of the at least one of the plurality of tensors in the cache is greater than or equal to the distance corresponding to each of the plurality of tensors which is not flushed in the cache.

* * * * *